United States Patent
Schäfer

(10) Patent No.: US 8,671,649 B2
(45) Date of Patent: Mar. 18, 2014

(54) SEPARATE PACKING STATION

(75) Inventor: Gerhard Schäfer, Neunkirchen (DE)

(73) Assignee: SSI Schafer Noell GmbH Lager- und Systemtechnik, Giebelstadt (DE)

( * ) Notice: Subject to any disclaimer, the term of this patent is extended or adjusted under 35 U.S.C. 154(b) by 771 days.

(21) Appl. No.: 12/275,623

(22) Filed: Nov. 21, 2008

(65) Prior Publication Data

US 2009/0139188 A1 Jun. 4, 2009

Related U.S. Application Data

(63) Continuation of application No. PCT/EP2007/004515, filed on May 22, 2007.

(30) Foreign Application Priority Data

May 24, 2006 (DE) .......................... 10 2006 025 617

(51) Int. Cl.
*B65B 5/00* (2006.01)

(52) U.S. Cl.
USPC .................................. 53/237; 53/474; 53/238

(58) Field of Classification Search
USPC ............. 53/474, 475, 237, 238, 587, 588, 52; 414/788.1, 789.6
See application file for complete search history.

(56) References Cited

U.S. PATENT DOCUMENTS

| | | | | |
|---|---|---|---|---|
| 3,581,921 A | * | 6/1971 | Boissevain et al. | 414/807 |
| 4,073,388 A | * | 2/1978 | Carter | 414/796.7 |
| 4,274,780 A | | 6/1981 | Kaul et al. | |
| 5,261,781 A | * | 11/1993 | Bandy | 414/791.6 |
| 5,451,136 A | * | 9/1995 | Easton | 414/795.8 |
| 5,540,545 A | * | 7/1996 | Roberts et al. | 414/789.6 |
| 5,562,403 A | * | 10/1996 | Winski | 414/791.6 |
| 5,701,722 A | * | 12/1997 | Franklin et al. | 53/588 |
| 5,716,189 A | * | 2/1998 | Winski et al. | 414/800 |
| 5,733,098 A | * | 3/1998 | Lyon et al. | 414/802 |
| 5,738,484 A | * | 4/1998 | Taylor | 414/788.1 |
| 5,844,807 A | * | 12/1998 | Anderson et al. | 414/789.6 |
| 5,934,864 A | * | 8/1999 | Lyon et al. | 414/789.6 |
| 7,033,130 B2 | * | 4/2006 | Watson et al. | 414/801 |

FOREIGN PATENT DOCUMENTS

| | | |
|---|---|---|
| DE | 3814101 | 11/1988 |
| DE | 10307949 | 9/2004 |
| EP | 0 007 119 B1 | 2/1981 |

* cited by examiner

*Primary Examiner* — Sameh H. Tawfik
(74) *Attorney, Agent, or Firm* — McNeely, Hare & War LLP; Kevin J. McNeely, Esq.

(57) ABSTRACT

A work station for packing articles to be picked onto a shipping support includes a platform, a packing station, a platform on the platform, a shipping support station beneath the platform, a lifting device for lifting an empty or partially packed shipping support and for lowering completely packed shipping supports, and a track for transporting loose articles to be picked to the packing station dedicated to load supports which conveys the articles to be picked on load supports to the packing station or from the conveyor technique can be order-picked.

24 Claims, 6 Drawing Sheets

SEPARATE PACKING STATION

RELATED APPLICATIONS

This is a continuation application of the co-pending international application PCT/EP2007/004515 filed on May 22, 2007 which claims priority of the German patent application DE 10 2006 025 617 filed on May 24, 2006 which is fully incorporated herewith by reference.

BACKGROUND OF THE INVENTION

The present invention relates to a work station for packing articles to be picked onto a shipping support, particularly onto a pallet or into a roller container.

The present invention further relates to a method for packing articles, which are to be picked, onto a shipping support.

RELATED PRIOR ART

In order-picking systems according to the prior art work stations for packing articles to be picked are known, wherein the articles are individually transported to the packing station by means of a conveyor technique. The order-picking process happens according to the principle "goods to man", i.e. an order picker, for ergonomic reasons, moves as less as possible during an order-picking process for which reason the goods to be picked are transported to the order picker.

Conventionally, the conveyor technique ends in a decreasingly tilted roller track having rollers freely rotatable or being clocked, wherein the packing station is provided at the lower end thereof. The order picker receives the single articles and packs them into the packing station.

A conventional packing station comprises, for example, a framed shaft, wherein the order picker packs the articles from above into the shaft. Within the shaft, there is arranged, for example, a vertically movable pallet onto which the articles to be picked can be packed. As soon as a layer of articles is packed onto the pallet, the pallet usually is lowered about a layer height so that a staff member (packer) can pack a next layer of articles. This process is repeated that often until all articles are packed which belong to the order-picking order.

Subsequently, the vertically movable pallet is moved to the lower end of the shaft. Then, the shipping support is moved (laterally) out of the shaft, and is wrapped with a thermo foil and welded at a remotely located place, if necessary, in order to protect the stack of articles from getting out of place and tilting.

The articles to be picked are buffered in a warehouse, for example, in so-called flow channels in a singularized manner. A flow channel is to be understood as a channel which is fed with articles from its one end side and is emptied at its oppositely arranged end. A typical flow channel comprises driven rollers. Dependent on an order-picking order, one or more articles are conveyed out of the flow channel, and are delivered to another conveyor technique, which trans-ports the delivered articles to a remotely located work station. Typically, these channels are dimensioned such that the articles of an entire pallet of the goods receipt can be received thereby. Then, the channels are correspondingly long. If several different types of articles are stored, the warehouse gets relatively huge. The space requirement is very high. The investment costs are correspondingly high.

One problem of this concept is to be seen in that articles, which, for example, can easily be damaged due to the nature of its packaging (so-called "non-conveyables" and "uglies") cannot be stored individually within flow channels.

Another problem is to be seen in that articles, which are statistically present very often in each order-picking order ("A" articles), require a lot of so-called exchange cycles (single cycles) in case of singularized storing within the flow channel. An exchange cycle is to be understood as each exchange of an article between elements of the order-picking system, particularly of a conveyor technique. The delivery of the article from the flow channel to the conveyor technique is exemplarily called an exchange cycle. The handing over of the article from the conveyor technique to the work station would be another example for an exchange cycle. Articles, which are to be supplied from the channels, then would have to be retrieved in a "batchwise" manner, in order to achieve the required performance. A "batch" is to be understood as the collection of several orders to form a sequenced amount of orders. By dispensing the articles from the channels in a batchwise manner an article mixture is generated, which has to be resolved at or in front of the work stations. For that purpose, so-called sorting devices or sorters are used.

The efforts which have to be made, in order to store or retrieve articles being statistically present very often, are high, and thus reduce the throughput, i.e. the number of articles, which can be actually order-picked and packed, for example, during one hour. Additionally, such articles require a lot of channels.

SUMMARY OF THE INVENTION

Therefore, it is an object of the present invention to provide a method and a work station for packing articles to be picked allowing a higher throughput, and less exchange cycles are required. Particularly, a gentle transport of the articles to the work station is desired.

This object is achieved by a work station as mentioned at the outset, wherein the work station comprises: a packing station; a platform, on which the packing station is arranged; a shipping support station being arranged beneath the platform; a lifting device for lifting empty or partially packed shipping supports onto a level of the packing station so that the empty or partially packed shipping support can be packed with articles to be picked, and for lowering completely packed shipping supports. The work station is further provided with a load support conveyor for conveying articles, which are to be picked, on load supports, particularly on trays, to the packing station such that articles can be picked either from the track or from the conveyor technique.

Thus, the work station in accordance with the present invention is provided with two separate feedings of articles to be picked. A first feeding happens by means of the conventional track. Single articles are fed via the track. Another feeding, however, happens by means of a conveyor, which delivers to the packing station preferably trays having a plurality of articles (of one sort only), which are to be picked. Articles stored on the trays preferably represent so-called fast movers, which statistically occur very often in order-picking orders.

Instead of transporting, for example, 10 single articles of a predetermined type (in a singularized manner) to the packing station, now trays are transported to the packing station containing several articles of the predetermined type. Thus, it is possible to reduce the number of exchange cycles, for example, from 10 to 1. An order picker can pick singularized articles from both the (single article) track and also from a tray. Thereby, the throughput of articles is increased while the conveyor performance is reduced simultaneously. Less articles have to be individually transported via the corresponding conveyor.

In accordance with a preferred embodiment the track comprises a delivery device at a side of the packing station.

The delivery device serves for interim storage of singularized articles to be picked. This provides the order picker with time needed for deciding whether to pack the article to be picked onto the shipping support, without the article falling off the track and occasionally damaging the same. The delivery device, thus, represents kind of a buffer.

Particularly, the track is designed in the form of another conveyor type. Preferably, the track is a chute.

If the track is constructed in accordance with a conveyor type, the transition from the conveyor to the track is simple. In case of using a chute, the articles are transported from the conveyor to the packing station only by gravity. A chute is particularly advantageous, if a pusher is used as dispensing device, in order to push articles from the conveyor onto the track. Additionally, a gravity roller track can be used having freely rotatable rollers and being slightly inclined. Optionally, driven or decelerated rollers can be employed as well.

Further, it is preferred if the track couples to an article conveyor for transporting articles to be packed from an article warehouse to the work station.

The article conveyor technique allows both the transport of singularized articles and articles, which are stored on trays.

Particularly, the article conveyor comprises a separating station upstream relative to the track. By the aid of the separating station articles to be packed can be separated from load supports such that the conveyor technique between the warehouse and the work station can be used for transporting single articles as well as trays.

For feeding singularized articles to the packing station, the articles are separated from the trays beforehand, i.e. exclusively articles on trays are transported between the warehouse and the separating station, allowing on the one hand the passage, and on the other hand the transport of fragile and easily damageable articles (on trays).

Particularly, the packing station comprises a packing frame.

The packing frame serves for laterally stabilizing a stack of articles to be formed on the shipping support.

In accordance with another preferred embodiment, the lifting device is movable vertically between a first position and a second position particularly in a packing-plane clocked manner.

As soon as a packing plane, i.e. a layer of packed articles, is completely packed, the shipping support being stored on the lifting device is lowered about an article layer height so that the next layer can be packed.

Even further it is advantageous, if the lifting device moves a shipping support, which is to be packed, into a serving height in the first position, which is individually adaptable and, particularly, lies in a packer's hips height.

A lifting device formed in this manner allows to satisfy the highest ergonomic requirements of the work station. The shipping support to be packed is always brought into the ergonomically correct height, independent from the body size of the staff member.

Another advantage is to be seen in that the packing station can be operated manually or mechanically.

This allows a higher degree of automation as well as a higher modularity, since both machines and humans can be used for packing. Also, designers of order-picking systems can form the order-picking system in a flexible manner.

In accordance with another embodiment, the packing station comprises a light grid which is arranged above a shipping support to be packed such that one can detect whether a packer has his/her extremities within the region of the shipping support to be packed, in order to generate corresponding control signals by which the movement of the lifting device is controlled.

The light grid allows to prevent the shipping support from being lowered before the packer has deposited the article which is currently to be packed. The same applies for the inverse direction, i.e. a lifting of the shipping support is prevented during a packing process. This measure serves for increasing the operational safety as well as for reducing the danger that articles can be damaged during the packing, for example, by falling deeply.

Preferably, the shipping support station is coupled to a shipping support conveyor technique.

In this manner empty and/or packed shipping supports can be transported to the packing station in an easy manner. This process can happen in an automated manner.

Further, it is advantageous if the shipping support station has a device for automatically exchanging shipping supports onto and from the lifting device.

The degree of automization is further increased by this measure.

In accordance with another embodiment, a wrapping device is provided beneath the packing station, in order to wrap a stack of articles packed onto the shipping device with a foil.

Getting out of place and canting over of the packed articles is prevented by this measure.

In accordance with a particular embodiment, the conveyor technique dedicated to load supports passes a region within which are arranged both the packing station and the end of the track at a side of the packing station.

The spatial region within which the packer has to work, thus is heavily limited. This fulfills highest ergonomic requirements. The packer does not need to move away for grabbing and packing articles.

Preferably, the conveyor technique dedicated for load supports is arranged beneath the track.

Since the load supports are, as a rule, much bigger than single articles, it is easier to arrange the bulky conveyor technique beneath the track, since the track must convey only single articles to the packing station. The track is geometrically smaller, and designed less complex in comparison to the conveyor technique.

Particularly, the region is defined by the range of an arm of a staff member.

This measure ensures that the packer does not need to walk while packing.

The above object is also achieved by a method for packing articles, which are to be picked, onto a shipping support, the method having the following steps: transporting to the packing station articles to be picked, which are stored on load supports, from a load support warehouse via a load support conveyor technique to a packing station as well as single article to be picked; serving the articles to be picked via a track dedicated to single articles and via the load supports conveyor technique for such articles being stored on load supports; and packing the served articles onto a shipping support.

Preferably, the shipping support is lowered in a layerwise manner when a layer of articles is packed onto the shipping support.

Particularly, the load supports are transported to the packing station with articles of one sort only.

BRIEF DESCRIPTION OF THE DRAWINGS

It is clear that the above-mentioned and hereinafter still to be explained features can not only be used in the respectively given combination but also in other combinations or alone, without departing from the scope of the present invention.

Embodiments of the invention are depicted in the drawings and will be explained in more detail in the following description.

PREFERRED EMBODIMENTS OF THE INVENTION

Figure 1:
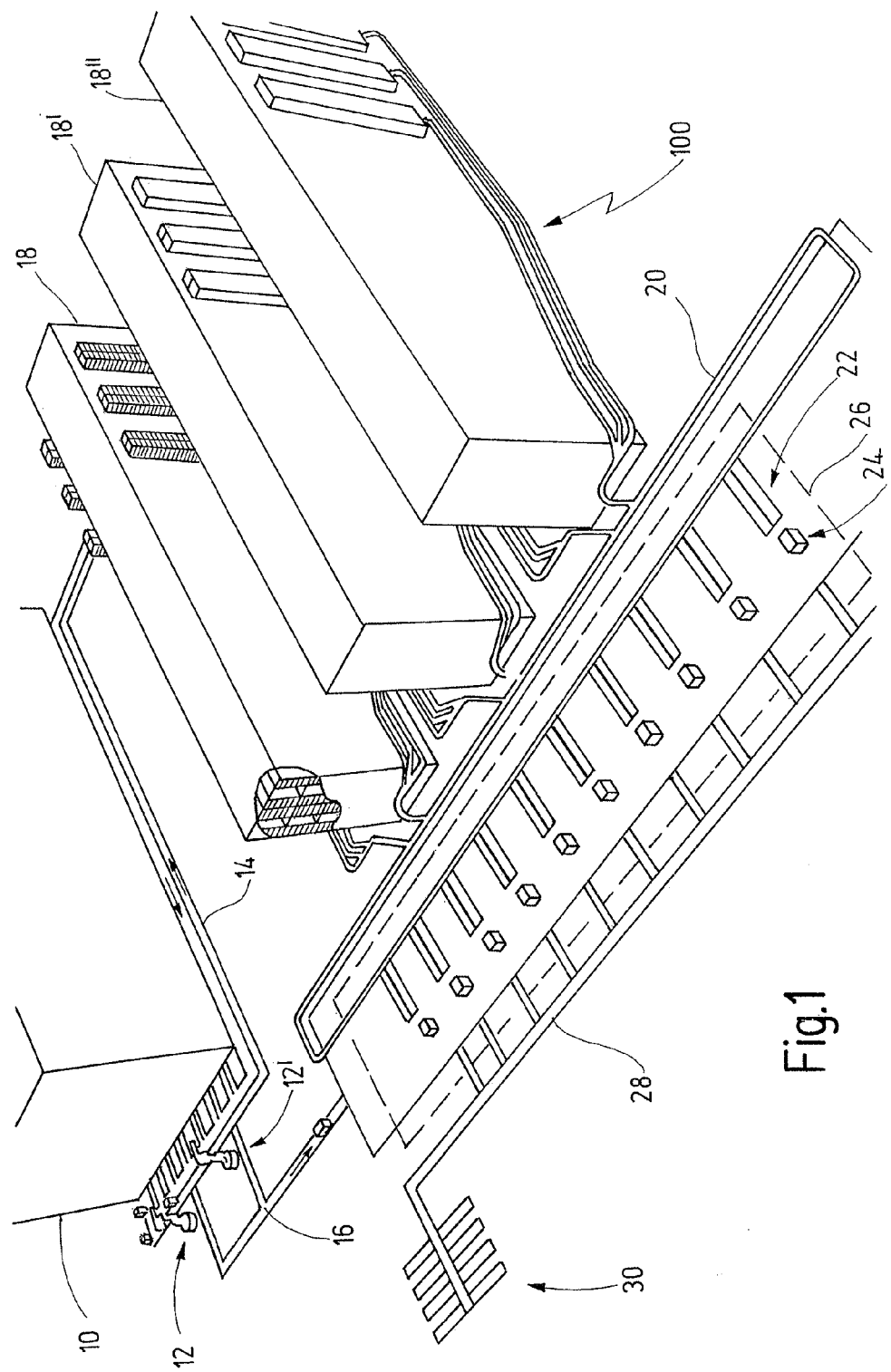
FIG. 1 shows a perspective view of an order-picking system.

In the description of the following drawings identical reference numerals are used for identical elements.

FIG. 1 shows an order-picking system 100.

The order-picking system 100 comprises a high-bay warehouse 10 in which articles, which are to be picked, are buffered on load supports, particularly on EuroPallets. Each EuroPallet contains a plurality of articles to be picked of one sort only, which are arranged preferably in layerwise pallet layers.

The order-picking system 100 further comprises depalletizing stations 12, 12', conveyor techniques 14, 16, 20 and 28, rack warehouses 18, 18' and 18", an area 26 dedicated to work stations 24 as well as a shipping area 30.

The term "conveyor technique" is hereinafter to be understood as devices such as roller tracks, belt conveyors, hanging conveyors, etc., by means of which articles can be transported directly, or in load supports such as pallets trays, containers, etc., between individual components of the order-picking system 100.

The depalletizing stations 12, 12' singularize the articles to be picked, which are stored in the high-bay rack warehouse 10 on EuroPallets. Preferably, the EuroPallets are depalletized in a layerwise manner. Empty pallets can be transported by means of the conveyor technique 16 to the area 26. Depalletized articles can be transported by means of the conveyor technique 14 to the rack warehouses 18-18", in order to be stored therein. The storing here happens preferably on trays, wherein the trays preferably are loaded respectively with a pallet layer.

By means of the conveyor technique 20 the trays are subsequently transported in accordance with an order-picking order to the area 26, where a packing process is performed at the work stations 24 during which articles to be packed onto the shipping support, particularly pallets or roller containers, are loaded. The area 26 lies at a higher level in comparison to the conveyor technique 28. The conveyor technique 28 serves for transporting completely packed shipping supports to the area 30, where the shipping supports are prepared completely for shipping, in order to be subsequently delivered, for example, by means of a truck.

Figure 2:
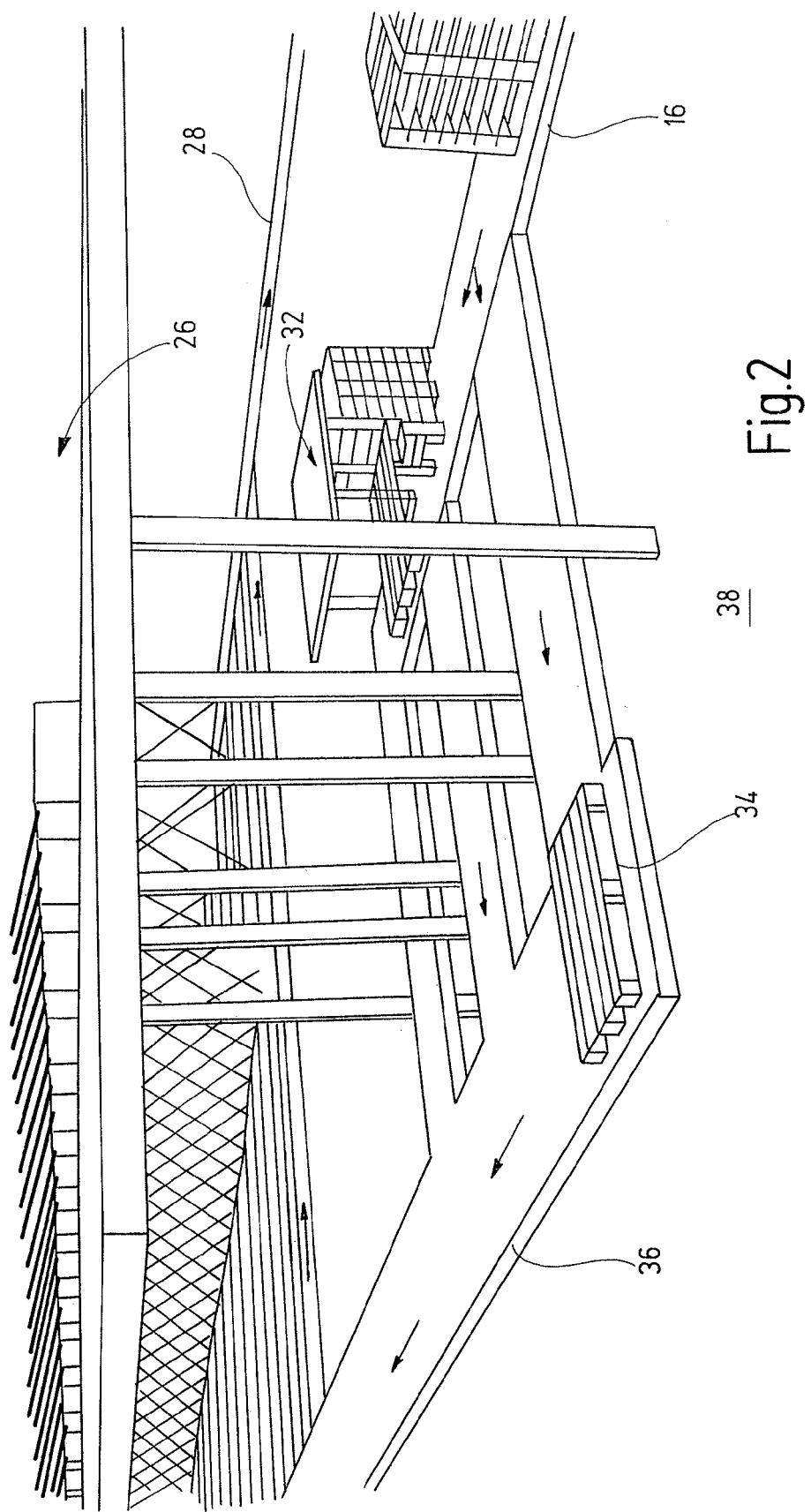
FIG. 2 shows a perspective view of a pallet conveyor technique and a pallet singularization station.

FIG. 2 shows a perspective view beneath a platform onto which the area 26 is arranged. In FIG. 2 empty shipping supports, here pallet stacks, are transported to a singularization station 32 dedicated to shipping supports 34. The singularization station singularizes the pallet stacks. The singularization station 32 is provided optionally and can be omitted as well, if the depalletizing stations 12, 12' (cf. FIG. 1) do not generate pallet stacks, which they send near the conveyor technique 16 towards a packing area 26. Alternatively, the empty shipping supports 34 can be provided via another way as well.

Singularized shipping supports 34 are brought beneath the area 26 by means of another conveyor technique 36. The conveyor technique 36 is arranged on a lower level 38, here the ground of a hall.

Figure 3:
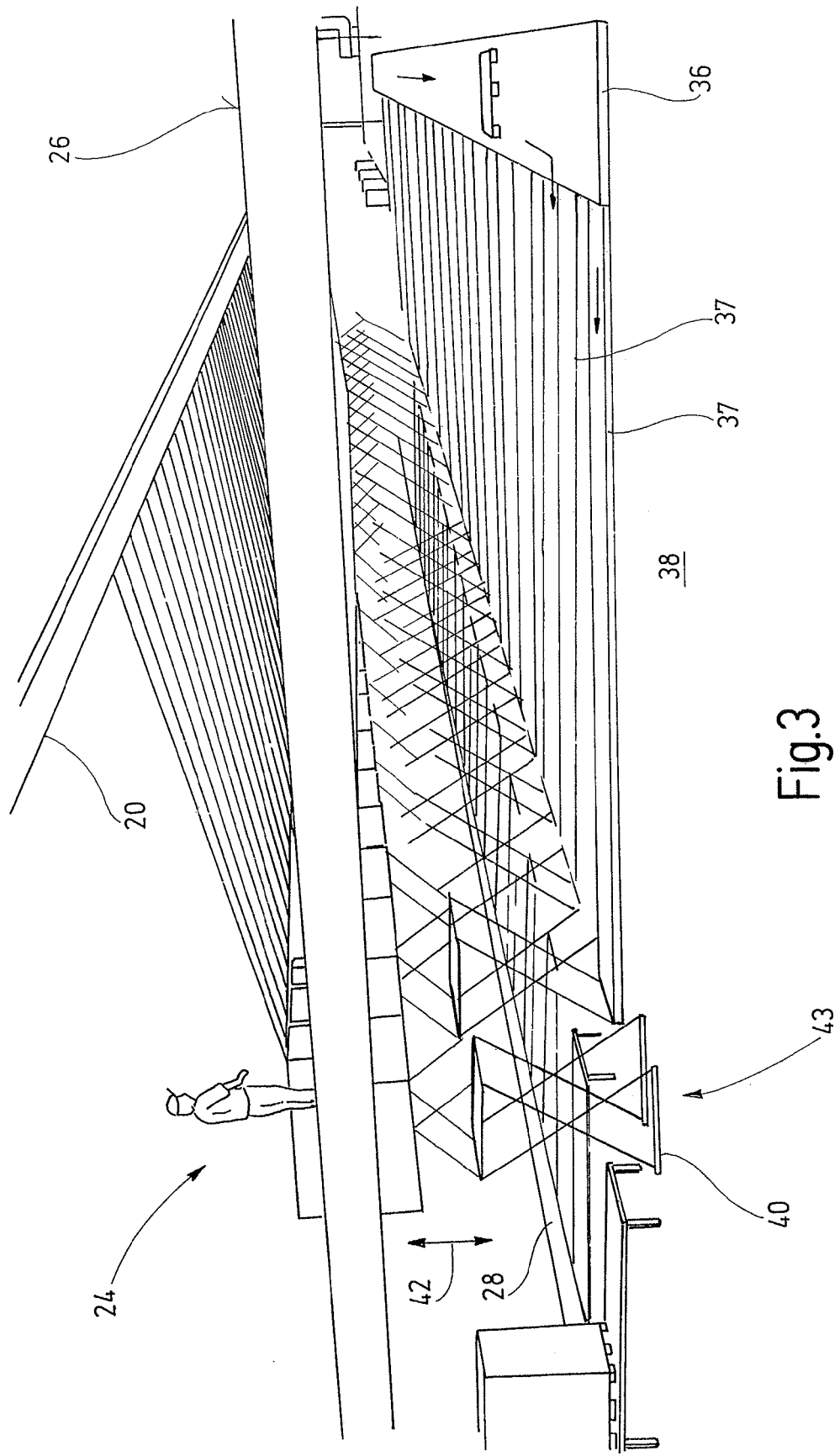
FIG. 3 shows a perspective view of two work planes, wherein a work station is arranged on a higher plane.

In the illustration of FIG. 3 one looks onto the end of the conveyor technique 36 of FIG. 2.

The conveyor technique 36 comprises puncture tracks 37 leading to lifting devices 40, in order to deliver empty shipping supports 34 to work stations 24 located at a level arranged thereabove. The lifting devices 40 are movable in a vertical direction 42 (cf. double arrow), particularly between a first position and a second position. In the first position, the lifting device 40 is lowered onto the level 38, in order to allow taking over of empty shipping supports 34 from the puncture tracks 37. For that purpose, the lifting device 40 preferably comprises a corresponding load suspension device, which is adapted for retrieval and delivery of shipping supports. In the second position, the lifting device 40 can travel such that a shipping support is served in the height of the work station 24, as it will be explained in more detail below.

Shipping support stations 43 are arranged at the level 38 as well, which at least comprise the lifting device 40.

Figure 4:
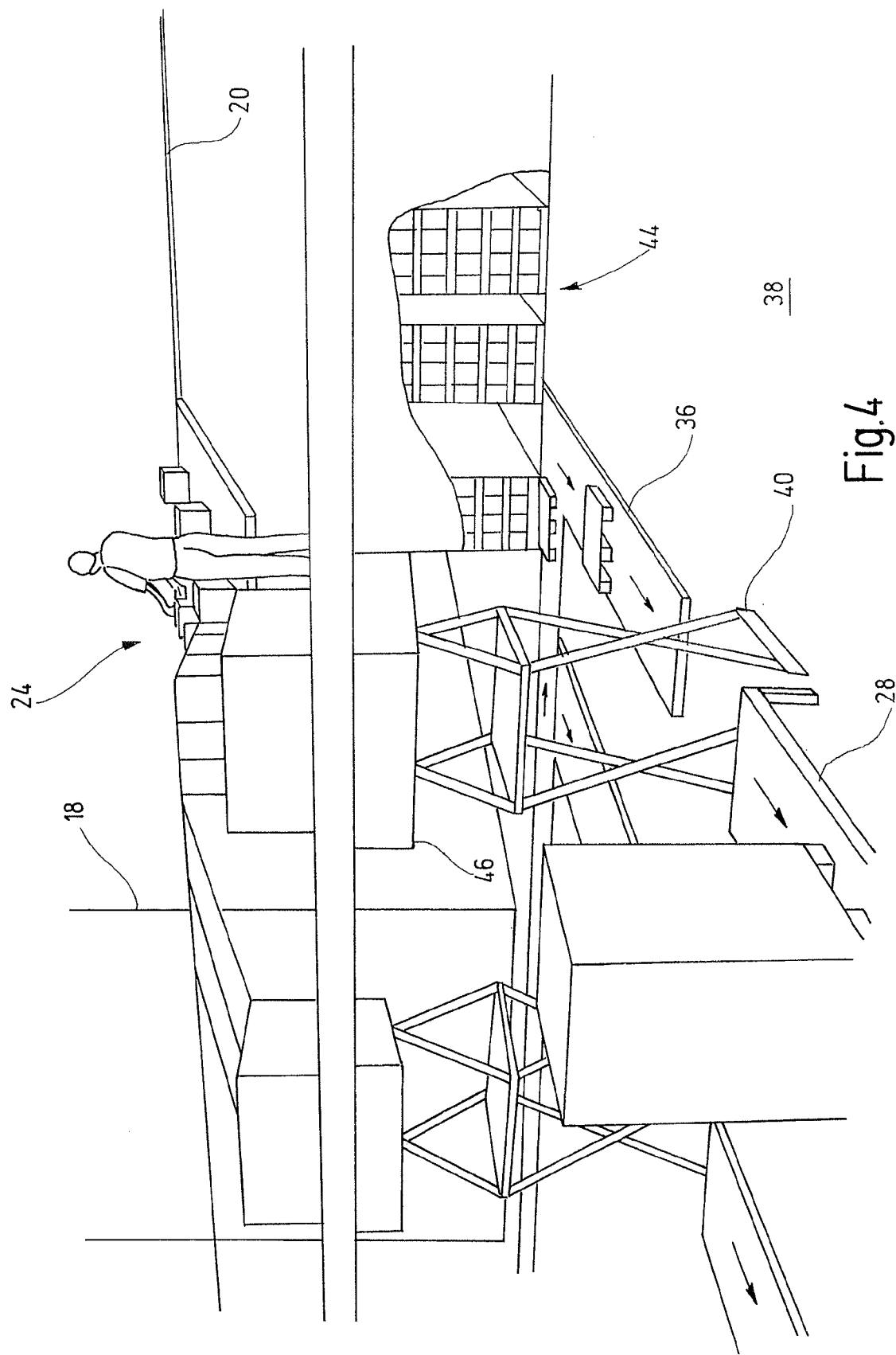
FIG. 4 shows another perspective view of FIG. 3.

With reference to FIG. 4 another perspective view of FIG. 3 is shown.

Beneath the platform, on which the work station 24 is arranged, a wrapping device 46 is arranged, preferably directly beneath thereof. With the aid of the wrapping device 46 foil tracks can be guided on an exterior circumference around the shipping support (here not depicted) such that articles, which have been stacked on this shipping support, can be wrapped with the foil, if the shipping support is lowered by means of the lifting device 40. As soon as a layer is packed onto the shipping support (completely), the lifting device 40 is lowered by the height of this layer. This can happen automated or by an order picker.

Beside the rack warehouse 18, in FIG. 4 a warehouse 44 dedicated to single articles is depicted, which is not shown in FIG. 1.

Figure 5:
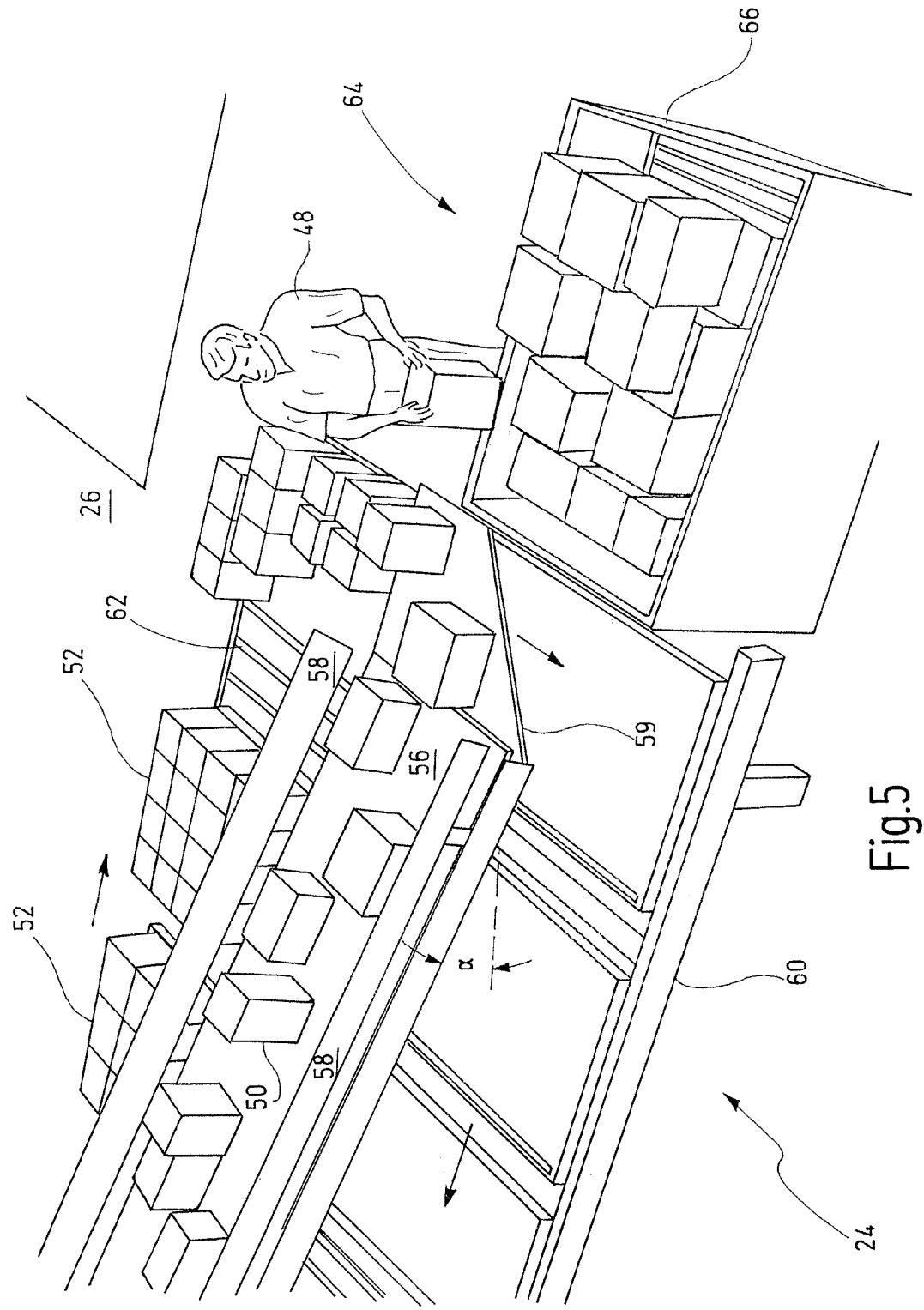
FIG. 5 shows a work station in accordance with the present invention in a perspective view.

In FIG. 5, a work station 24 in accordance with the present invention is shown in detail. The work station 24 for packing articles to be picked is served by a packer 48.

The packer 48 packs single articles 50 or articles of an article layer 52 onto the shipping support. The article layer 52 is formed by a plurality of single articles 50, which are provided on a tray 54 at the work station 24, particularly in the form of a pallet layer.

Here, the single articles 50 are guided via a track 56, here comprising lateral guiding areas 58, to the packer 48. The track 56 can end in a delivery device 59, from which the packer 58 can remove the articles to be picked. The delivery 59 prevents, on the one hand, that the articles 50 fall off the track 56. On the other hand, the packer 48 gains time for deciding whether he/she places the article 50 onto the shipping support, or for packing articles from trays. The track 56 is preferably used for the delivery of slow movers. It can be formed of rollers, some of which are preferably decelerated.

The term "slow movers" is to be understood as articles which statistically occur less often in each order-picking order and, therefore, are not that often required like fast movers. Fast movers ("A" articles) are preferably transported on the trays 54 via a load supports conveyor technique 60 to the work station 24. Here, the conveyor technique 60 is a roller track being formed of rollers 62. However, another conveyor technique (carrying chains, lace conveyors, preferably double tracked etc.) can be utilized as well.

The packer 48 also either removes article 50 from the delivery 59 or articles 52 from the trays 54 (load capacity up to 250 kg) for packing the same into a packing station 64 which preferably comprises a frame 66. The frame 66 serves for laterally stabilizing the packed articles. At least one side of the frame 66 can be formed foldable or lowerable, in order to facilitate the access of the packer to the shipping support. Further, disturbances can be eliminated more easily, and maintenance operations can be performed more easily. The access to the shipping support, in principle, is possible from three sides, which represents another advantage of the present invention, since the packer 48 does not need to stretch extraordinarily, but can easily pack from another side.

If the articles cannot be packed directly onto a shipping support such as a roller container, since the lateral support elements of the roller container would project from the packing station and obstruct the packing process, alternatively a stacking board such as a metal sheet can be used. Articles are stacked onto this metal sheet. If the stack of articles is completely packed, the metal sheet is disposed on a shipping load (vertically) and pulled out (horizontally), comparable to a cake server being pulled out beneath a piece of cake.

In FIG. 5, the shipping support cannot be seen, since already a plurality of articles is stacked thereon. It is clear that FIG. 5 shows a top view of the platform of FIGS. 2 and 3, respectively. Empty shipping supports 34 are lifted from the level 38, arranged beneath the platform, by means of the lifting device 40 (cf. FIGS. 3 and 4) to the level of the work station 24. As soon as a layer is completely packed onto the shipping support, the lifting device 40 can be lowered by the packer 48 by the height of one layer either in an automated manner or by actuating a key (in FIG. 5 the key is not shown). If a stacking board is used, the shipping support is provided at the height of the level 38, and the stacking board is lowered step-by-step.

Further, the conveyor technique 60 of FIG. 5 can be formed of two tracks. One of the tracks serves for the supply of loaded trays 54, whereas the other track serves for transporting away the trays 54. The change from one of the tracks to the other can also happen in an automated manner. Even further, it is to be noted that the track 56 is slightly tilted with an angle α in comparison to the horizontal, along which the conveyor technique 60 is arranged. The track 56 is tilted so that the articles 50 can slide on its own (if necessary) to the delivery 59 due to gravity. Here, as already mentioned above, roller tracks can be used, which can be operated in a cycled and decelerated manner.

Additionally, the work flow can be inverted. This means that the work station can also be used for storing articles into the warehouse. Articles to be stored are delivered via the packing station. The packer 48 removes the articles and packs the same onto trays, which, in turn, are transported into the warehouse. It is clear that the packer can also be substituted by a correspondingly adapted robot.

This inversion of the work flow has the advantage that during times of lower packing volume the warehouse can be filled again, mainly by such packers who are not running to capacity due to packing processes.

Further, return articles which are supplied on pallets can be disbanded and re-stored into the warehouse.

Further, it is clear that one or more tracks 56 can be guided to the order picker 48.

Also, several conveyor technique tracks dedicated to load supports can be provided. For example, three tracks can be provided, two of them, which are arranged exteriorly, supplying trays and the centrally arranged track transporting away empty partially empty trays. In this instance, it is advantageous if two packers 48 work at the packing station simultaneously. It is clear that several packers could work at the packing station as well.

The work station 24 is characterized, among other things, in its high ergonomics. The packer 48 almost does not need to move (walk) for packing articles. However, if it happens that the packer 48 cannot reach a location on the shipping support sufficiently good, the packer 48 can walk around the frame 66 for achieving a better position for packing. But, the packer preferably does not walk. The loads which have to be moved by the packer 48 are limited to the nominal weight of the articles. The trays 54 do not need to be moved by the packer 48. The throughput is increased enormously. Fast movers are transported by means of trays and slow movers by means of the track 56 to the work station 24.

Figure 6:
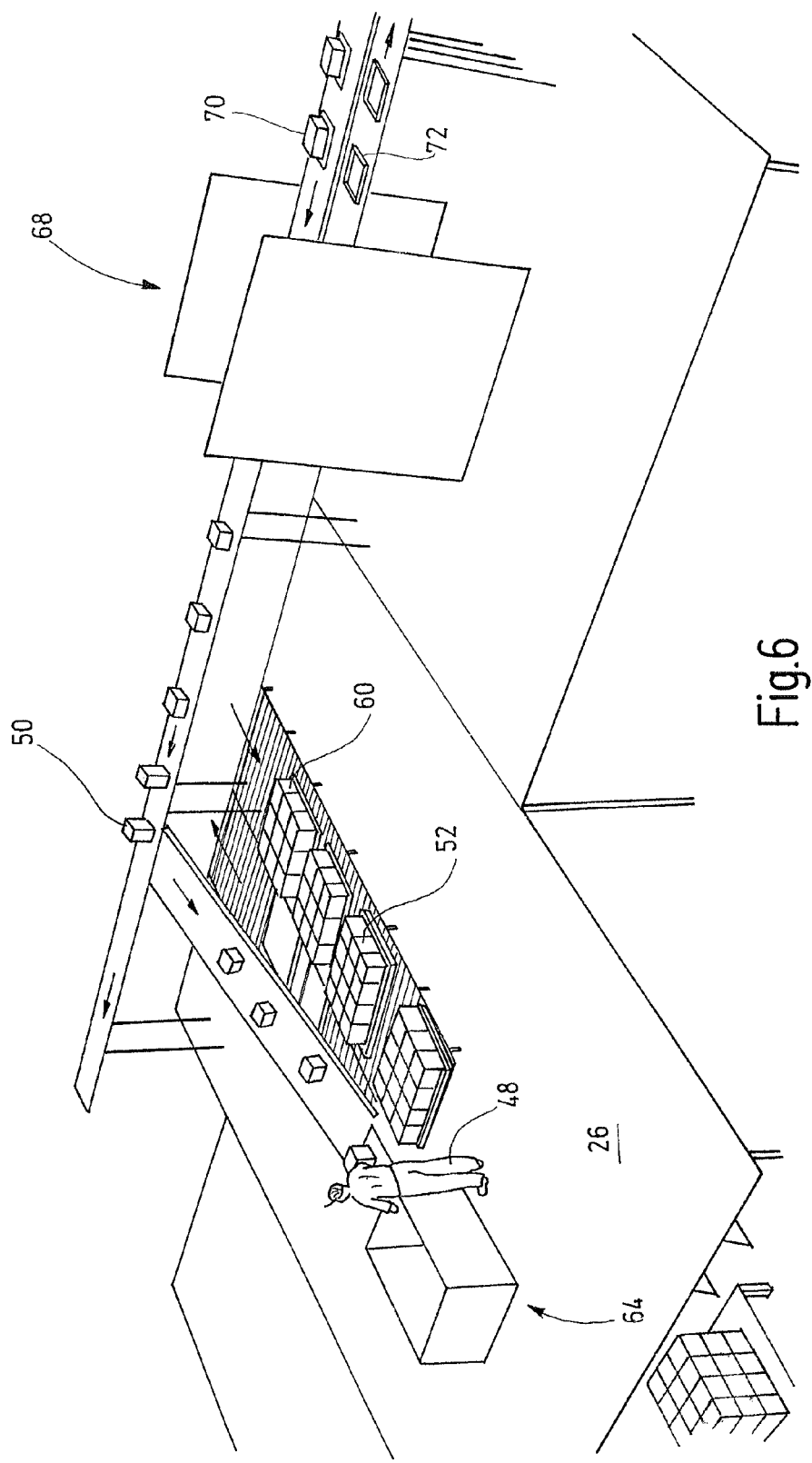
FIG. 6 shows another work station in accordance with the invention in a perspective view.

FIG. 6 shows the work station of FIG. 5 from a remotely located position.

In the right half of FIG. 6, a separating station 68 is additionally provided which, for example, is coupled to the conveyor technique 20 (cf. FIG. 1). The conveyor technique 20 can also be connected to the conveyor technique 60 such that layers of articles (pallet layers) 52 and individual articles 70 (also on trays) can be supplied to the work station 24, namely via the conveyor technique 20. Empty trays 72, for example, can be transported to the depalletizing stations 12, 12' (cf. FIG. 1) in order to be re-stored with articles back into the rack warehouse 18 subsequently.

It is clear that several work stations 24 in accordance with the present invention can be arranged side-by-side (cf. FIG. 1). Almost all processes within the order-picking system 100 are coordinated and controlled by one or more superordinated warehouse computers.

Alternatively, the trays can also be guided past several work stations. The trays can be unloaded by an order picker (not shown in the Figures) within the area at the beginning of the track 56 such that the order picker removes articles from the tray and puts these onto the track. This way of action has the advantage that not any tray has to be guided to the packing station. Thus, a multiple-stop strategy can be followed for the load supports.

Therefore, we claim:

1. A work station to pack articles, which are to be picked, by a packer onto a shipping support, wherein the work station comprises:
   a packing station comprising a packing frame;
   a platform, on which the packing station is arranged;
   a shipping support station arranged beneath the platform;
   a lifting device to lift an empty or partially packed shipping support to a height of the packing station so that the empty or partial packed shipping support can be packed with articles to be picked, and to lower completely packed shipping supports;
   a single-article feeder track, which is directed towards the packing station, to transport to the packing station single articles, which are to be picked; and
   a load-support conveyor feeder to convey a pallet layer of articles to be picked on a respective load support towards the packing station, so that articles can be taken from the single-article feeder track or from the load-support conveyor feeder in order to pack the shipping support.

2. The work station of claim 1, wherein the shipping support is a pallet or a roller container, and the load support is a tray.

3. The work station of claim 2, wherein the load supports are larger than a single article such that the trays comprise a load capacity up to 250 kg.

4. The work station of claim 1, wherein the track comprises a delivery device.

5. The work station of claim 4, wherein the delivery device is arranged horizontally.

6. The work station of claim 1, wherein the track is of another conveyor type.

7. The work station of claim 1, wherein the track is a chute.

8. The work station of claim 1, wherein the track is coupled to an article conveyor to transport articles, which are to be picked, from an article warehouse to the work station.

9. The work station of claim 8, wherein the article conveyor comprises a separating station, arranged upstream relative to the track, in order to separate the articles, which are to be picked from the load supports.

10. The work station of claim 1, wherein the lifting device is movable vertically between a first position and a second position in a packing plane clocked manner.

11. The work station of claim 10, wherein the lifting device in the first position moves a shipping support, which is to be packed, onto a serving height which is individually adapted and arranged in hip height of a packing person.

12. The work station of claim 1, wherein the packing station comprises a light grid arranged above a shipping support to be packed such that it is detectable whether a packing person has extremities within an area of the shipping support to be packed, in order to generate corresponding control signals to control movement of the lifting device.

13. The work station of claim 1, wherein the shipping support station is coupled to a shipping support conveyor to transport at least one of empty and packed shipping supports.

14. The work station of claim 1, wherein the shipping support station comprises a device to exchange shipping supports onto and from the lifting device in an automated manner.

15. The work station of claim 1, wherein the load support conveyor traverses an area in which both the packing station and an end of the track at the side of the packing station are arranged, wherein each of the load supports carries one layer of articles to be picked.

16. The work station of claim 15, wherein the load support conveyor is arranged beneath the track.

17. The work station of claim 15, wherein the area is defined such that the packing person does not need to walk for the purpose of packing articles onto the shipping support.

18. The work station of claim 1, wherein the load support conveyor comprises a feeding track and an output track.

19. The work station of claim 18, wherein two feeding tracks are provided surrounding the output track centrally, wherein the feeding and output tracks are preferably oriented parallel to the track.

20. The work station of claim 1, wherein the load support is adapted to carry a pallet layer of articles.

21. The work station of claim 1, wherein the single-article feeder track and the load-support conveyor feeder comprise two separate feeds of different articles to be packed.

22. The work station of claim 1, wherein:
a stack of article layers is packed onto the shipping support by the packer; and
each layer of the stack comprise different articles.

23. The work station of claim 1, wherein some of the articles packed onto the shipping support have different shapes and sizes.

24. The work station of claim 1, wherein the pallet layer of articles to be picked comprise only one type of article.

* * * * *